United States Patent
Arndt (10) Patent No.: US 8,086,769 B2
(45) Date of Patent: Dec. 27, 2011

(54) METHOD FOR DETECTING CIRCULAR BUFFER OVERRUN

(75) Inventor: Richard L. Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/015,546

(22) Filed: Jan. 17, 2008

(65) Prior Publication Data

US 2009/0187682 A1    Jul. 23, 2009

(51) Int. Cl.
*G06F 3/00* (2006.01)
*G06F 5/00* (2006.01)
*G01R 31/08* (2006.01)
*H04L 12/28* (2006.01)

(52) U.S. Cl. ......... 710/52; 710/20; 710/36; 710/53; 710/55; 710/56; 710/57; 370/232; 370/412

(58) Field of Classification Search .................. None
See application file for complete search history.

(56) References Cited

U.S. PATENT DOCUMENTS

| | | | |
|---|---|---|---|
| 4,692,894 A * | 9/1987 | Bemis .................. | 710/57 |
| 5,978,868 A * | 11/1999 | Maas .................. | 710/52 |
| 6,216,208 B1 * | 4/2001 | Greiner et al. .................. | 711/137 |
| 6,615,296 B2 * | 9/2003 | Daniel et al. .................. | 710/57 |
| 6,735,661 B2 * | 5/2004 | Gelke et al. .................. | 710/307 |
| 6,877,049 B1 | 4/2005 | Myers | |
| 7,089,380 B1 | 8/2006 | Schober | |
| 7,239,645 B2 * | 7/2007 | Suri et al. .................. | 370/412 |
| 7,475,221 B1 * | 1/2009 | Metzgen et al. .................. | 711/219 |
| 7,499,399 B2 * | 3/2009 | Kumar et al. .................. | 370/232 |
| 7,536,473 B2 * | 5/2009 | Ajanovic et al. .................. | 709/234 |
| 7,546,480 B1 * | 6/2009 | Swenson et al. .................. | 713/400 |
| 7,610,413 B2 * | 10/2009 | Pope et al. .................. | 710/36 |
| 7,876,769 B2 * | 1/2011 | Gupta et al. .................. | 370/428 |
| 2001/0038633 A1 * | 11/2001 | Robertson et al. .................. | 370/412 |
| 2001/0052055 A1 * | 12/2001 | Haller et al. .................. | 711/147 |
| 2002/0184414 A1 * | 12/2002 | Jin et al. .................. | 710/57 |
| 2004/0019715 A1 * | 1/2004 | Apfeldorfer et al. .................. | 710/57 |
| 2007/0118702 A1 * | 5/2007 | Gupta et al. .................. | 711/154 |

OTHER PUBLICATIONS

W de Bruijn et al. "Beltway buffers: Avoiding the OS Traffic Jam." INFOCOM 2008. The 27th Conference on Computer Communications, Apr. 13-18, 2008 (May 2, 2008). http://ieeexplore.ieee.org/xpls/abs_all.jsp?arnumber=4509631.*

* cited by examiner

*Primary Examiner* — Tariq Hafiz
*Assistant Examiner* — Henry Yu
(74) *Attorney, Agent, or Firm* — Yee & Associates, P.C.; Matthew W. Baca (57) ABSTRACT

A computer implemented method, data processing system, and computer program product for detecting circular buffer overflow. When an entry in the circular buffer is read, a valid mark bit in the entry is set to an inactive state and the location of the entry is stored as an entry previously processed. A valid mark bit of a next entry and the valid mark bit in the entry previously processed are read. Responsive to determining that the valid mark bit in the entry previously processed is in the inactive state and the valid mark bit in the next entry is in an active state, the next entry is read, the valid mark bit in the next entry is set to an incative state, and the location of the next entry is stored as the entry previously processed. Responsive to determining that the valid mark bit in the entry previously processed is in the active state, a determination is made that a circular buffer overflow has occurred.

14 Claims, 3 Drawing Sheets

METHOD FOR DETECTING CIRCULAR BUFFER OVERRUN

This invention was made with Government support under Contract No. HR0011-07-9-0002 awarded by Defense Advanced Research Projects Agency (DARPA). The government has certain rights in this invention.

BACKGROUND OF THE INVENTION

1. Field of the Invention

The present invention relates generally to an improved data processing system, and in particular to a computer implemented method, data processing system, and computer program product for detecting circular buffer overrun.

2. Description of the Related Art

Circular buffers are a staple of computer science memory management to solve the problem of matching variations in the processing speed of asynchronous data producers and data consumers. A circular buffer is a data structure that uses a single, fixed size buffer as if it were connected end-to-end. In a circular buffer, information is written starting at a given location and continues to the end of the buffer, whereupon the next piece of information is written at the first location in the buffer. In like manner, information is read from the buffer in the order in which the information was entered. When the end of the buffer is reached, the next location to be processed is again the first location in the buffer.

In the current art, pointers are used to manage the locations in a circular buffer where a process will write to or read from. A mechanism known as a "head pointer" is used to point to the buffer location to which data is to be next written, and a mechanism known as a "tail pointer" is used to point to the buffer location from which data is to be next read. In a typical circular buffer protocol embodiment, a data producer uses the head pointer to determine the next buffer location to be written. After the data producer writes data to the buffer starting at the determined location, the data producer then updates the head pointer value to the location the data producer intends to next fill and reads the tail pointer value to ensure that the location that the data producer intends to next fill has indeed been emptied by the data consumer. In like manner, a data consumer uses the tail pointer to determine the next location to be read. After the data consumer reads data from the buffer starting at the determined location, the data consumer updates the tail pointer value to the location that the data consumer intends to next process, and then reads the head pointer value to ensure that the location that the data consumer intends to next process has indeed been filled by the data producer. An example of a data producer/data consumer pair is a data producer which may be a LAN receiver (such as an Ethernet adapter) receiving data packets from the Internet and placing the packets on a circular TCP/IP protocol processing program's receive circular buffer, while the data consumer may be the TCP/IP protocol processing program itself. In another example, the data producer may be a computer keyboard, and the data consumer may be the operating system's keyboard device driver program from the keyboard's circular buffer. In this example, the keyboard circular buffer in turn parses out the incoming key strokes to the applications owning the various display "windows", thus itself becoming a data producer for those various data consuming applications.

A problem with the existing circular buffer protocol embodiment is that while in theory it may work well, in practice, in modern computer systems, this embodiment may result in long latency accesses. Often the data producer and data consumer partner processes are electrically at a significant distance from each other. The head pointer is stored physically at the location of the data producer, and the tail pointer is stored physically at the location of the data consumer. In this situation, the data producer must read the tail pointer stored at the location of the data consumer partner process, and the data consumer must read the head pointer stored at the location of the data producer partner process. These pointer reads produce long latency accesses due to the distance between the data producer and consumer.

Therefore, it would be advantageous to have a circular buffer protocol that prevents long latency accesses by avoiding the reading of a pointer of a partner process. It would also be advantageous to have a mechanism for determining when a partner process has violated the circular buffer protocol causing the circular buffer to overflow.

SUMMARY

The illustrative embodiments provide a computer implemented method, data processing system, and computer program product for detecting circular buffer overflow. When an entry in the circular buffer is read, a valid mark bit in the entry is set to an inactive state and the location of the entry is stored as an entry previously processed. A valid mark bit of a next entry and the valid mark bit in the entry previously processed are read. Responsive to determining that the valid mark bit in the entry previously processed is in the inactive state and the valid mark bit in the next entry is in an active state, the next entry is read, the valid mark bit in the next entry is set to an inactive state, and the location of the next entry is stored as the entry previously processed. Responsive to determining that the valid mark bit in the entry previously processed is in the active state, a determination is made that a circular buffer overflow has occurred.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
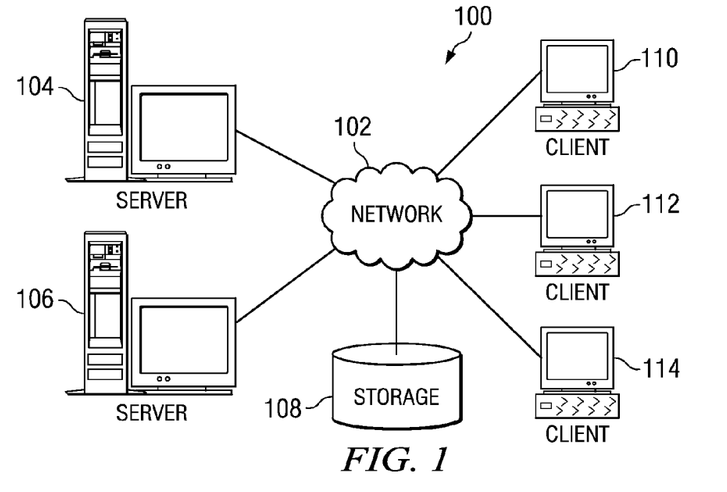
FIG. 1 depicts a pictorial representation of a distributed data processing system in which the illustrative embodiments may be implemented.
Figure 2:
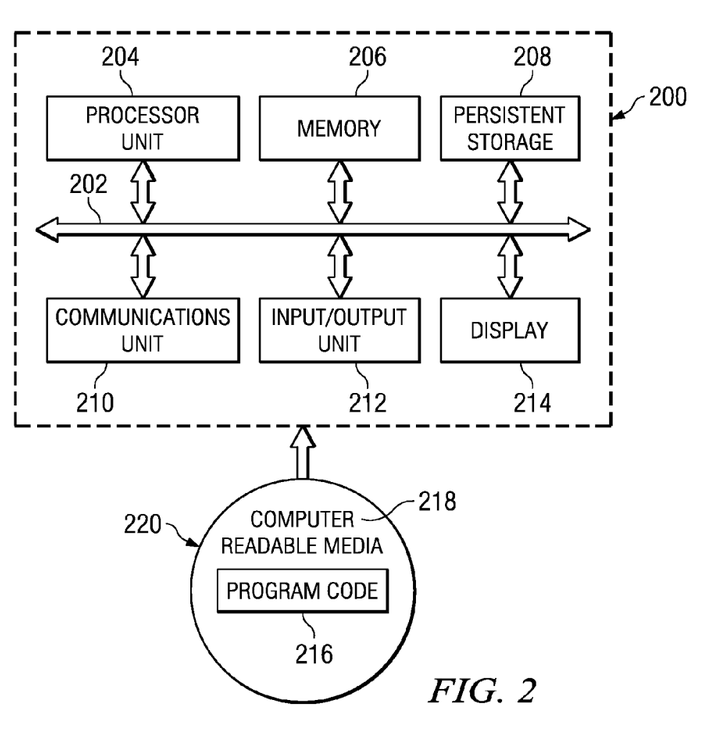
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Memory 206 may comprise buffers, including circular buffers. Circular buffers have a fixed number of entries. When a pointer in a process reaches a last location in the circular buffer (e.g., location 99), the process wraps around and points to the first location in the circular buffer (e.g., location 0). Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media x18 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments provide a mechanism for detecting circular buffer overflow. Specifically, the mechanism in the illustrative embodiments allows for determining when a partner process has violated the circular buffer protocol, causing the circular buffer to overflow. As previously mentioned, when data producer and data consumer partner processes are electrically at a significant distance from each other, the traditional circular buffer methods involve long latency accesses since the data producer must read the tail pointer stored at the location of the data consumer partner process to ensure that the data the producer intends to write into the circular buffer will not be overwriting data that has not yet been processed by the data consumer (i.e., the data producer will not be overflowing the circular buffer), and the data consumer must read the head pointer stored at the location of the data producer partner process to determine if the circular buffer location that the consumer intends to read (as pointed to by the tail pointer) has actually been filled by the data producer (i.e., the data consumer will not be creating a data "underflow" condition). The illustrative mechanism employs a marking method which allows a data consumer partner process to determine whether or not the data consumer has data to process in the circular buffer. This marking method enables the data consumer to make this determination without having to read the head pointer stored at the location of the data producer, which can typically be at a significant distance from the data consumer. The marking method uses a valid data bit within a data item in the circular buffer which indicates whether or not the data item is active. An active data item is data which is available for processing by the data consumer. The data producer marks the valid data bit of a data item as 'active' when the data producer inserts the data item in the buffer. The data consumer unmarks the valid data bit of the data item when the data consumer reads the data item. Thus, with such a marking method, a data consumer may determine if there is data in the circular buffer to process by determining whether the valid data bit for a data item is active without incurring long latency accesses from reading the head pointer at the data producer's location.

The illustrative mechanism also employs a credit exchange method to prevent the data producer partner process from inserting in more data into the circular buffer than the buffer can hold. This credit method limits the amount of data that the data producer partner process may insert into the circular buffer. The data consumer in such a credit exchange method sends a credit message to the data producer each time the data consumer has processed one or more data items. This credit message informs the data producer of the number of data items the producer may insert into the circular buffer (e.g., if data consumer processes 3 data items, the message is used to inform the data producer that the producer has 3 credits and thus may insert only 3 data items into the buffer). Thus, the credit exchange method may prevent the data producer from inserting more data items into the circular buffer than the buffer can actually hold. In certain circumstances, however, the credit exchange method may not be reliable. Consequently, the data producer may, in error, assume it has more credits than it actually has. In this situation, the data producer may cause a circular buffer protocol error by inserting more items into the buffer than the buffer can hold, thereby causing the buffer to overflow. Thus, even with the credit exchange method which is used to prevent buffer overflow, a circular buffer protocol error may still result if the data producer does not receive the credit message.

The illustrative embodiments allow for the data consumer to determine when a data producer has violated the circular buffer protocol. The illustrative embodiments provide a total outstanding credit amount given to the data producer in the credit exchange method which is at least one less than the number of circular buffer entries. Thus, there should always be at least one entry in the circular buffer which is not filled with data. As the data consumer processes entries in the buffer, the data consumer stores the location of the last entry in the buffer it has just processed. This last entry is known as the last previously processed entry. The data consumer also resets the valid data bit in the last previously processed entry (e.g., the bit is reset to 'inactive'). When the data consumer processes the next entry in the buffer, the data consumer also checks the last previously processed entry to see if the last previously processed entry is marked as 'active'. Since the data producer is allowed only to fill one less entry than the total number of entries in the buffer, this last previously processed entry location in the circular buffer should not be marked as active (i.e., it should be empty). If the last previously processed entry is marked as active, the data producer has violated the credit protocol by inserting more data into the circular buffer over the number of credits the data producer is allowed. In response, the data consumer may raise a circular buffer protocol exception to notify that an error has occurred.

Figure 3:
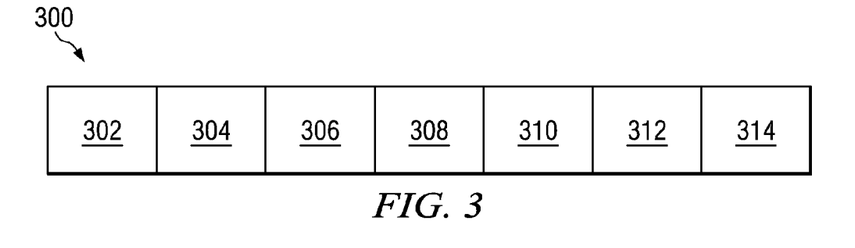
FIG. 3 is a diagram illustrating a known circular buffer.

FIG. 3 depicts a known circular buffer in which aspects of the present invention may be implemented. Circular buffer may be implemented in memory, such as memory 206 in FIG. 2. In this illustrative example, circular buffer 300 is shown to comprise seven locations, 302-314. When a process reading from or writing to the circular buffer reaches the last location in buffer (e.g., location 314), the process wraps around to the first location in the buffer (e.g., location 302).

When a data producer writes data to circular buffer 300, each new data item is appended in sequence after the first data item added. For example, if a data item is written to location 306, if two additional data items are added, these data items are inserted into locations 308 and 310. A data consumer may then read/remove data items from circular buffer 300 as needed. When circular buffer 300 is full (i.e., all entries in the buffer contain data items), any subsequent writes by the data producer will begin overwriting the oldest data in the buffer.

In a traditional circular buffer, the data producer and data consumer use pointers to manage the locations in a circular buffer where a process will write to or read from. The data producer uses a head pointer to determine the next buffer location to be written. After the data producer writes data to the buffer starting at the determined location, the data producer updates the head pointer value to the location the data producer intends to next fill and reads the tail pointer value to ensure that the location that the data producer intends to next fill has indeed been emptied by the data consumer. The data consumer uses a tail pointer to determine the next location to be written. After the data consumer reads data from the buffer starting at the determined location, the data consumer updates the tail pointer value to the location that the data consumer intends to next process, and then reads the head pointer value to ensure that the location that the data consumer intends to next process has indeed been filled by the data producer.

Figure 4:
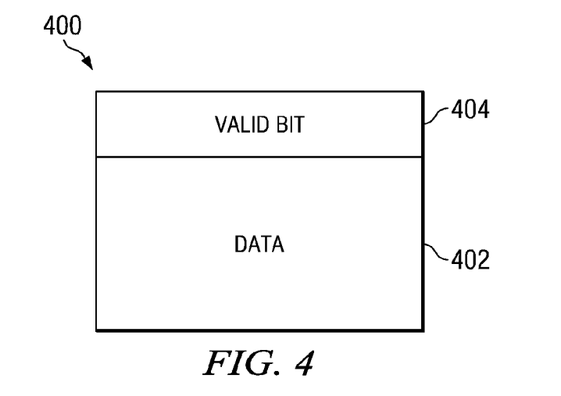
FIG. 4 is a diagram illustrating using a marking method to determine whether there is data to process in the circular buffer.

FIG. 4 is a diagram illustrating a marking method with which aspects of the illustrative embodiments may be implemented. The marking method is used in the illustrative embodiments to determine whether there is data to process in the circular buffer. The marking method is used as an alternative to the traditional process of reading a partner process's head or tail pointer. In the traditional process, for example, a data consumer reads the head pointer of the data producer process to determine when the consumer has data items to process. If the head pointer of the data producer is further ahead of the tail pointer of the data consumer, then the data consumer knows there is data it needs to process in the buffer. The data producer reads the tail pointer of the data consumer process to determine if the data producer has overflowed the data consumer's ability to process the data. However, this traditional process of reading a partner's process head or tail pointer results in latency problems when the pointers are not located in the same place.

The marking method employed by the illustrative embodiments provides an alternative embodiment to reading the partner process's pointer. In the marking method, the data producer writes a data item 400 to the buffer. Data item 400 may be inserted by the data producer into one of entries 302-314 in FIG. 3. This data item 400 contains data 402 to be consumed by the data consumer, as well as a valid mark bit 404. Valid mark bit 404 is used by the data producer to mark a data entry to indicate to the data consumer that the consumer has a data item to process. Valid data bit 404 within data item 400 indicates whether or not the data item is active (i.e., the data item is available for processing by the data consumer). The data producer marks valid data bit 404 of data item 400 as 'active' when the data producer inserts the data item in the buffer. In turn, the data consumer checks the valid mark bit for each location it is about to process. If valid mark bit 404 indicates that data item 400 is active, the data consumer processes the data item. The data consumer then resets valid mark bit 404 of data item 400 back to 'inactive'. This marking method allows the data consumer to process marked entries beginning at its tail pointer value (resetting the valid bit marks as the consumer processes the entries) until the data consumer reaches an entry that is not marked, all without having to read the producer's head pointer. Similarly, the marking method enables the data producer to read the mark in the next entry the data producer is about to fill, and if the mark has been reset, the data producer knows it may overwrite the data in that entry. If the mark has not been reset, the data producer knows it has overflowed the data consumer's ability to process data.

Figure 5:
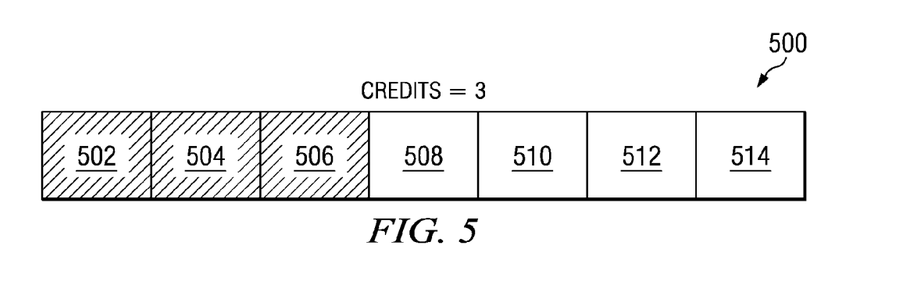
FIG. 5 is a diagram of a credit exchange system for limiting the amount of data that may be inserted into the circular buffer.

FIG. 5 is a diagram of a credit exchange method with which aspects of the illustrative embodiments may be implemented. The credit exchange method is used in the illustrative embodiments to allow the data consumer to provide the data producer an explicit credit to produce n entries to the circular buffer. Providing such a credit to the data producer allows for limiting the amount of data that may be inserted into the circular buffer to prevent a buffer overflow. The illustrative embodiments employ the credit exchange method with the marking method as described in FIG. 4.

In this illustrative example, circular buffer 500 is shown to comprise seven locations, 502-514. Locations 502-506 are empty storage locations (i.e., locations which are available to receive incoming data from the data producer without overwriting another entry that has not yet been processed by the data consumer). Locations 508-514 are filled storage locations (i.e., locations which are not available to receive incoming data from the data producer and contain data items that have not been processed by the data consumer.

The data consumer sends a credit message to the data producer each time the data consumer has processed one or more data items. In this example, the data consumer has processed locations 502, 504, and 506. The credit message informs the data producer that the data producer has three credits. Consequently, the data producer knows that the data producer may insert data items into these three locations in circular buffer 500 without causing the buffer to overflow. In this manner, the credit exchange method may prevent the data producer from causing a circular buffer protocol error by inadvertently inserting more data items into the circular buffer than the buffer can actually hold.

As previously mentioned, the credit exchange method, due to processing errors, may cause the data producer to assume that it has more credits than it actually has. In this situation, the data producer may cause a circular buffer protocol error by inserting more items into the buffer than the buffer can hold, thereby causing the buffer to overflow. The illustrative embodiments address this problem caused by processing errors by providing a mechanism for detecting when a data producer process has violated the circular buffer protocol.

Figure 6:
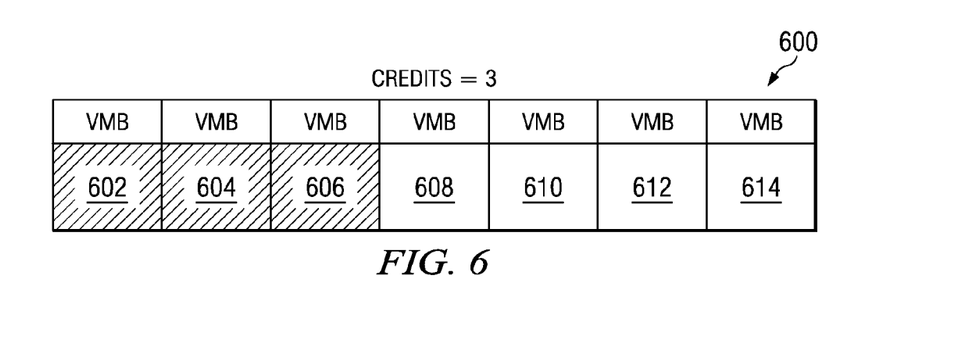
FIG. 6 is a diagram of an exemplary circular buffer mechanism for determining when a partner process has violated the circular buffer protocol.

FIG. 6 is an exemplary diagram of a circular buffer mechanism for detecting when a data producer has inserted data over the credit limit specified by the data consumer. The circular buffer mechanism in the illustrative embodiments provides a total outstanding credit to the data producer which is at least one less than the number of circular buffer entries. Thus, in this illustrative example, at least one of the seven locations 602-614 is not filled by the data producer at all times. As shown, the data consumer has processed 3 entries 602-606 in the buffer, and the data consumer has subsequently provided the data producer with 3 credits. As the data consumer processes each entry, the data consumer resets the valid data bits to 'inactive'. The data consumer also reads the valid data bit of the next location (e.g., location 608) in the buffer to determine if that entry needs to be processed. When the data consumer reads the next location that may be filled with data to be processed, the data consumer stores the location of the last previously processed entry (e.g., location 606). The data consumer checks the last entry it previously processed to see if this last previously processed entry is marked as 'active'. Thus, the data consumer checks the valid mark bit of both locations 606 and 608.

When checking the valid mark bits, there are four scenarios which may result. In the first case, the valid mark bits for both locations 606 and 608 indicate that neither location is filled with data (i.e., valid mark bits='inactive'). In this case, the data consumer takes no action, since there is no data for the consumer to process in location 608, and the last previously processed location 606 is in the desired state (not active). In the second case, the valid mark bit for location 608 indicates the location is filled with data for the consumer to process, while the valid mark bit for location 606 indicates that this location is not filled with data. In this case, the data consumer processes location 608, and the last previously processed location 606 is in the desired state (not active). Thus, the first and second cases do not result in a circular buffer protocol error.

In the third case, the valid mark bit for both locations 606 and 608 indicate that both locations are filled with data (i.e., valid mark bits='active'). In the fourth case, the valid mark bit for location 606 indicates that this location is filled with data (i.e., valid mark bit='active'), while the valid mark bit for location 608 indicates that this location is not filled with data (i.e., valid mark bit='inactive'). In both of these cases, the data consumer knows that a circular buffer protocol error has occurred, since the last entry previously processed by the data consumer should not be filled (i.e., the valid mark bit for location 606 should be inactive). Since the data producer has inserted more data into the buffer beyond the credit amount given to the data producer, the data consumer generates a circular buffer protocol exception to notify the system administrator of the protocol error.

Figure 7:
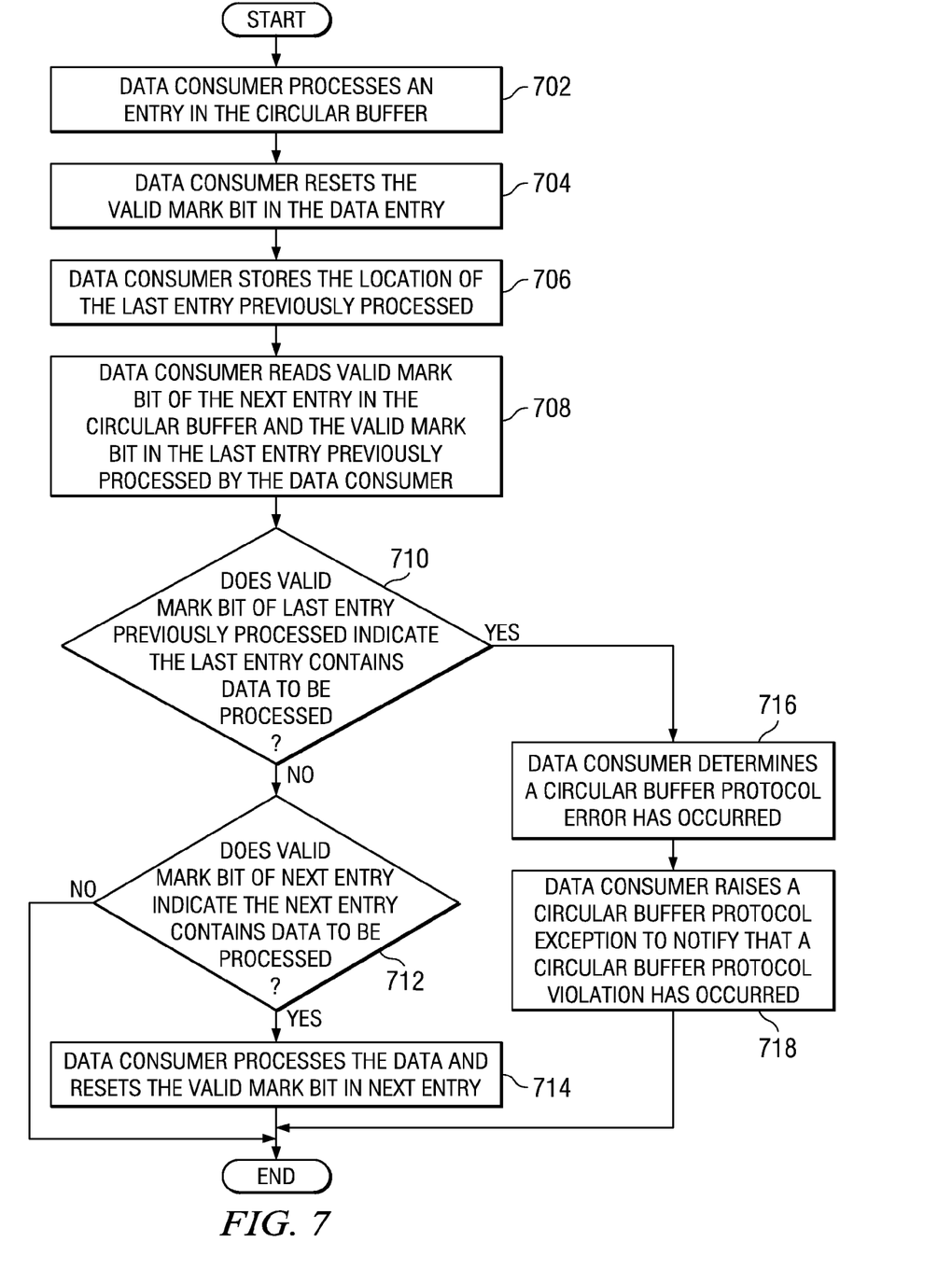
FIG. 7 is a flowchart of a process for determining when the circular buffer protocol has been violated.

FIG. 7 is a flowchart of the process for determining when a data producer has inserted data over the credit limit specified by the data consumer. The process described in FIG. 7 may be implemented by program code in the data consumer. The process may also be by hardware finite state machines, etc. in an alternative embodiment. The process described in FIG. 7 also assumes that the total credit exchange amount for the circular buffer is at least one less than the total number of entries in the buffer. Thus, for a circular buffer with 8 entries, the data producer may have a maximum of 7 credits at any one time.

The process begins with the data consumer processing (reading) an entry in the circular buffer (step 702). When the data consumer processes an entry, the data consumer resets the valid mark bit in the data entry to 'inactive' (step 704). The data consumer also stores the location of this last entry previously processed by the consumer (step 706).

The data consumer then reads the valid mark bit of the next entry in the circular buffer and the valid mark bit in the last entry previously processed by the data consumer (step 708). The data consumer makes a determination whether the valid mark bit of the last entry previously processed by the consumer indicates that the entry contains data to be processed (step 710). In other words, the data consumer checks the valid mark bit of the last entry processed to determine if the data producer has inserted data into the entry. The valid mark bit indicates that the entry contains data to be processed if the bit is marked 'active'.

If the valid mark bit of the last entry previously processed by the data consumer indicates that the last entry processed does not contain data to be processed by the consumer ('no' output of step 710), the data consumer then makes a determination whether the valid mark bit of the next entry indicates that the next entry contains data to be processed (step 712). If the valid mark bit of the next entry indicates that the next entry contains data to be processed ('yes' output of step 712), the data consumer processes the data in the next entry and resets the valid mark bit in the next entry (step 714). If the valid mark bit of the next entry indicates that the next entry does not contain data to be processed ('no' output of step 712), the data consumer process terminates thereafter.

Turning back to step 710, if the valid mark bit in the last entry previously processed by the data consumer indicates that the last entry processed contains data to be processed by the consumer ('yes' output of step 710), the data consumer determines that a circular buffer protocol error has occurred (step 716). Since the data producer is allowed only to fill one less than the number of buffer entries, this last entry processed in the circular buffer should not be marked as active (i.e., it should be empty). If the last previously processed entry is marked as active, the data producer has violated the credit protocol by inserting more data into the circular buffer over the number of credits the data producer is allowed. In response, the data consumer may raise a circular buffer protocol exception to notify that a violation of the circular buffer protocol has occurred (step 718).

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system of detecting circular buffer overflow, the computer implemented method comprising:

reading an entry in the circular buffer;

responsive to reading the entry, setting a valid mark bit in the entry to an inactive state;

responsive to setting the valid mark bit in the entry, storing a location of the entry as an entry previously processed;

reading a valid mark bit in a next entry and the valid mark bit in the entry previously processed, wherein the next entry is located in the circular buffer immediately after the entry previously processed;

responsive to a determination that the valid mark bit in the entry previously processed is in the inactive state indicating the entry previously processed contains no new data to be read and the valid mark bit in the next entry is in an active state indicating the next entry contains new data to be read: reading the next entry, setting the valid mark bit in the next entry to the inactive state in response to reading the next entry, and storing a location of the next entry as the entry previously processed in response to setting the valid mark bit in the next entry; and responsive to a determination that the valid mark bit in the entry previously processed is in the active state indicating the entry previously processed contains new data to be read, determining that a circular buffer protocol has been violated and indicating within the data processing system that a circular buffer overflow has occurred.

2. The computer implemented method of claim 1, further comprising:

responsive to the determination that the valid mark bit in the entry previously processed indicates the entry previously processed contains new data to be read, determining that more entries have been inserted into the circular buffer than the circular buffer can hold.

3. The computer implemented method of claim 1, wherein the processing, storing, reading, and determining steps are performed by a data consumer of the circular buffer.

4. The computer implemented method of claim 1, wherein the entry contains data to be processed if the valid mark bit of the entry is set to the active state and wherein the valid mark bit of the entry is set to the active state when data is inserted into the entry.

5. The computer implemented method of claim 1, wherein the circular buffer implements a credit based management system, wherein the credit based management system comprises a total credit exchange amount of at least one less than a total number of available locations for entries in the circular buffer.

6. A computer program product of detecting circular buffer overflow, the computer program product comprising:

a computer usable storage medium having computer usable program code tangibly embodied thereon, the computer usable program code comprising:

computer usable program code for reading an entry in the circular buffer;

computer usable program code for setting, in response to reading the entry, setting a valid mark bit in the entry to an inactive state;

computer usable program code for storing a location of the entry as an entry previously processed;

computer usable program code for reading a valid mark bit of a next entry and the valid mark bit in the entry previously processed, wherein the next entry is located in the circular buffer immediately after the entry previously processed;

computer usable program code for, in response to a determination that the valid mark bit in the entry previously processed is in the inactive state indicating the entry previously processed contains no new data to be read and the valid mark bit in the next entry is in an active state indicating the next entry contains new data to be read: reading the next entry, setting the valid mark bit in the next entry to the inactive state in response to reading the next entry, and storing a location of the next entry as the entry previously processed in response to setting the valid mark bit in the next entry; and computer usable program code for, in response to a determination that the valid mark bit in the entry previously processed is in the active state indicating the entry previously processed contains new data to be read, determining that a circular buffer protocol has been violated and indicating that a circular buffer overflow has occurred.

7. The computer program product of claim 6, further comprising:

computer usable program code for determining, in response to the determination that the valid mark bit in the entry previously processed indicates the entry previously processed contains new data to be read, that more entries have been inserted into the circular buffer than the circular buffer can hold.

8. The computer program product of claim 6, wherein the computer usable program code for processing, storing, reading, and determining are performed by a data consumer of the circular buffer.

9. The computer program product of claim 6, wherein the entry contains new data to be read if the valid mark bit of the entry is set to the active state and wherein the valid mark bit of the entry is set to the active state when the new data is inserted into the entry.

10. The computer program product of claim 9, wherein the circular buffer implements a credit based management system, wherein the credit based management system comprises a total credit exchange amount of at least one less than a total number of available locations for entries in the circular buffer.

11. A data processing system of detecting circular buffer overflow, the data processing system comprising:

a bus;

a storage device connected to the bus, wherein the storage device contains computer usable code;

at least one managed device connected to the bus;

a communications unit connected to the bus; and a processing unit connected to the bus, wherein the processing unit executes the computer usable code to read an entry in the circular buffer; set, in response to reading the entry, setting a valid mark bit in the entry to an inactive state; store a location of the entry as an entry previously processed; read a valid mark bit of a next entry and the valid mark bit in the entry previously processed, wherein the next entry is located in the circular buffer immediately after the entry previously processed; in response to a determination that the valid mark bit in the entry previously processed is in the inactive state indicating the entry previously processed contains no new data to be read and the valid mark bit in the next entry is in an active state indicating the next entry contains new data to be read: read the next entry, set the valid mark bit in the next entry to the inactive state in response to reading the next entry, and store a location of the next entry as the entry previously processed in response to setting the valid mark bit in the next entry; and in response to a determination that the valid mark bit in the entry previously processed is in the active state indicating the entry previously processed contains new data to be read, determine that a circular buffer protocol has been violated and indicate within the data processing system that a circular buffer overflow has occurred.

12. The data processing system of claim 11, wherein the processing unit further executes the computer usable code to determine, in response to the determination that the valid mark bit in the entry previously processed indicates the entry previously processed contains new data to be read, that more entries have been inserted into the circular buffer than the circular buffer can hold.

13. The data processing system of claim 11, wherein the entry contains data to be read processed if the valid mark bit of the entry is set to the active state and wherein the valid mark bit of the entry is set to the active state when the new data is inserted into the entry.

14. The data processing system of claim 13, wherein the circular buffer implements a credit based management system, wherein the credit based management system comprises a total credit exchange amount of at least one less than a total number of available locations for entries in the circular buffer.

* * * * *